United States Patent [19]
Hutchison, IV

[11] Patent Number: 5,953,674
[45] Date of Patent: Sep. 14, 1999

[54] ASYNCHRONOUS SERIAL COMMUNICATIONS ON A PORTABLE COMMUNICATION DEVICE SERIAL COMMUNICATION BUS

[75] Inventor: James A. Hutchison, IV, San Diego, Calif.

[73] Assignee: Qualcomm Incorporated, San Diego, Calif.

[21] Appl. No.: 08/799,732

[22] Filed: Feb. 12, 1997

[51] Int. Cl.⁶ .......................................... H04Q 7/32
[52] U.S. Cl. ............................. 455/557; 455/569
[58] Field of Search ................................ 455/557, 550, 455/435, 509; 340/825.5; 370/503, 537, 538, 539

[56] References Cited

U.S. PATENT DOCUMENTS

| | | | |
|---|---|---|---|
| 5,007,050 | 4/1991 | Kasparian et al. | 370/77 |
| 5,471,643 | 11/1995 | Marui | 455/435 |
| 5,483,530 | 1/1996 | Davis et al. | 370/465 |
| 5,495,246 | 2/1996 | Nichols et al. | 341/155 |
| 5,602,900 | 2/1997 | Hattori | 455/550 |
| 5,727,233 | 5/1997 | Lynch et al. | 395/885 |

FOREIGN PATENT DOCUMENTS

| | | | |
|---|---|---|---|
| 4107732 | 3/1991 | Germany | H04B 1/38 |
| 9009065 | 8/1990 | WIPO | H04B 3/60 |
| 9302531 | 2/1993 | WIPO | H04Q 7/00 |
| 9741700 | 11/1997 | WIPO | H04Q 7/32 |

*Primary Examiner*—Dwayne D. Bost
*Assistant Examiner*—Myron K. Wyche
*Attorney, Agent, or Firm*—Russell B. Miller; Roger W. Martin; Charles D. Brown

[57] ABSTRACT

A portable communications device and accessory system which provides full-duplex asynchronous communications between a portable communication device and external accessories over a synchronous digital interface. The system includes a digital signal processor for generating a first synchronous digital voice signal, a UART for generating a first asynchronous data signal, and a microprocessor for generating a synchronous control command signal. The system further includes a first multiplexer for multiplexing the first synchronous digital voice signal and the first asynchronous data signal and the synchronous control command signal onto an interface line. The interface line couples the communication device to the at least one external accessory. A second multiplexer is coupled to the interface line, for routing the first synchronous digital voice signal and the synchronous control command signal to the at least one synchronous internal device, and for routing the first asynchronous data signal to the asynchronous internal device.

9 Claims, 3 Drawing Sheets

--PRIOR ART--

ASYNCHRONOUS SERIAL COMMUNICATIONS ON A PORTABLE COMMUNICATION DEVICE SERIAL COMMUNICATION BUS

BACKGROUND OF THE INVENTION

I. Field of the Invention

The present invention relates generally to portable communication systems. More particularly, the present invention relates to novel and improved portable communications device and accessory system which provides full-duplex asynchronous communications between a portable communication device and external accessories over a synchronous digital interface.

II. Description of the Related Art

There are presently multiple types of cellular radiotelephone systems operating. These systems include the frequency modulated (FM) advanced mobile phone system (AMPS) and two digital cellular systems: time division multiple access (TDMA and GSM), and code division multiple access (CDMA). The digital cellular systems are being implemented to handle capacity problems that AMPS is experiencing. Dual-mode CDMA/FM radiotelephones exist which are selectively operative in either FM or CDMA modes. Telecommunications Industry Association (TIA)/ Electronic Industries Association (EIA) Interim Standard 95, entitled "Mobile Station-Base Station Compatibility Standard for Dual-Mode Wideband Spread Spectrum Cellular System" sets forth the requirements and standards for a dual-mode radiotelephone which is selectively operative in either FM or CDMA modes.

A typical portable cellular radiotelephone may be interfaced with one or more external accessories. For example, the portable telephone user may desire to use his portable radiotelephone in his car while driving, and thus interface it with a hands-free speakerphone, a power booster, and/or a voice-operated dialer. The hands-free speakerphone (or hands-free "kit") allows the user to make phone calls, via an external loudspeaker and microphone, without holding the telephone. The power booster couples radio frequency (RF) signal to and from the portable radiotelephone's own antenna, amplifying the RF signal for the higher power transmission and reception that is desirable when operating off of a car battery. A voice dialer responds to verbal commands from the user, dialing from a set of preprogrammed telephone numbers according to the voice commands. These accessories are often used at the same time as part of a car adapter kit.

In the prior art, each of these external accessories requires at least one separate interface to the portable radiotelephone. For example, consider the typical prior art portable radiotelephone accessory system illustrated in FIG. 1. The portable device 100, which could be a cellular phone, a personal communication services (PCS) phone, or similar device, comprises microphone and speaker 106, multiplexer 104, encoder/decoder (CODEC) 102, digital signal processor (DSP) 108, microprocessor 110, UART 126, transceiver 112, and antenna 111.

In operation, antenna 111 receives an RF signal which is subsequently downconverted and demodulated by transceiver 112. The demodulated digital signal is passed to DSP 108 for audio-band processing, and then to CODEC 102 for conversion to an analog voice signal. For transmission, the reverse path is followed, i.e. the analog voice signal is converted to a digital signal by CODEC 102, processed by DSP 108, and passed to transceiver 112 for upconversion and modulation before transmission on antenna 111. When portable device 100 is in a portable mode (i.e. when not connected to external accessories) microprocessor 110 configures multiplexer 104 to pass the analog voice signal to and from microphone and speaker 106, which are housed in portable device 100. However, when portable device 100 is interfaced with hands-free kit 114, microprocessor 110 configures multiplexer 104 to pass the analog voice signal, over analog interface 113, to and from auxiliary microphone and speaker 116 which are housed in hands-free kit 114. In addition, when portable device 100 is interfaced with power booster 118, RF signals are received and transmitted by external antenna 120, amplified by power booster 118, and coupled to and from antenna 111 in portable device 100.

The difficulty with the prior art is encountered when one desires to pass control commands to hands-free kit 114 or power booster 118, or to control other external accessories such as voice dialer 122. Since analog interface 113 carries analog voice signals, it is not suited to carry digital control commands to external accessories. As such, separate command interfaces 115, and 117 are necessary to pass control commands to hands-free kit 114 and power booster 118, respectively. Commands to hands-free kit 114 may include instructions to automatically turn auxiliary microphone and speaker 116 on and off, or to automatically mute the car's installed stereo during a hands-free call. Commands to power booster 118 may include transmit and receive power control commands. Furthermore, the command interfaces 115 and 117 are generally synchronous serial input/output (I/O) interfaces. Since voice dialer 122, and indeed other possible accessories, may require an asynchronous interface serial communications interface with the UART 126, and command interfaces 115 and 117 are generally unsuited for asynchronous communications, asynchronous interface 124 must be a separate interface than the others. Thus, as can be seen from FIG. 1, at least one separate interface 113, 115, 117, and 124 must be used to interface portable device 100 with each desired external accessory 114, 118, and 122 adding cost and complexity.

Another difficulty with the prior art system of FIG. 1 is that when portable device 100 is interfaced with hands-free kit 114 (i.e. when operating in hands-free mode), the normal full-duplex operation of simultaneous talk and listen is suspended. This is required to prevent undesired feedback between the auxiliary speaker and microphone 116. Typically, the hands-free mode of operation is controlled by a voice-activated switch (VOX) which switches between the talk and listen paths according to the activity level of the path. If portable device 100 is operating in an FM mode, the talk and listen paths are both simultaneously enabled during hands-free operation, however the inactive path is always attenuated to prevent acoustic oscillation. If portable device 100 is operating in a digital mode, the inactive path is muted whenever active voice frames arrive from the base station. Unfortunately, the VOX switching works well only when both portable device 100 and the calling unit are in relatively quiet environments. For instance, if the caller is in a noisy public place, and the user of portable device 100 is in hands-free operation in the relative quiet of a car interior, the caller is likely to hear only broken portions of the conversation because the VOX will favor the caller's background noise over the speech of the user of portable device 100.

What is needed is a portable communication device and accessories that communicate both voice and command data over a single flexible interface, and also provides for full-duplex communication between the portable device and the accessories.

SUMMARY OF THE INVENTION

The present invention is a novel and improved portable communications device and accessory system which provides full-duplex asynchronous communications between a portable communication device and external accessories over a synchronous digital interface.

The system is useful for exchanging asynchronous data over a synchronous communication interface between a communication device and an external accessory, where the external accessory has at least one asynchronous internal device and at least one synchronous internal device. The system includes a digital signal processor for generating a first synchronous digital voice signal, a UART for generating a first asynchronous data signal, and a microprocessor for generating a synchronous control command signal. The system further includes a first multiplexer for multiplexing the first synchronous digital voice signal and the first asynchronous data signal and the synchronous control command signal onto an interface line. The interface line couples the communication device to the at least one external accessory. A second multiplexer is coupled to the interface line, for routing the first synchronous digital voice signal and the synchronous control command signal to the at least one synchronous internal device, and for routing the first asynchronous data signal to the asynchronous internal device.

In the preferred embodiment, the external accessory is a hands-free kit the at least one asynchronous internal device may be a voice dialer or other asynchronous device. Also, the synchronous devices in the hands-free kit may be an auxiliary CODEC for decoding the first synchronous digital voice signal, an auxiliary microphone for receiving the synchronous control command signal, and an auxiliary speaker for receiving the synchronous control command signal. The system may also include a power booster coupled to the interface line, for receiving the synchronous control command signal.

The system operates in full-duplex. As such, the asynchronous internal device is further for generating a second asynchronous data signal, and the at least one synchronous internal device is further for generating a second synchronous digital voice signal and a synchronous status indication signal. The second multiplexer also multiplexes the second asynchronous data signal and the synchronous status indication signal onto the interface line. Furthermore, the first multiplexer routes the second asynchronous data signal to the UART and the synchronous status indication signal to the microprocessor.

In the preferred embodiment, the data signal communicated over the interface line has a data frame format. Each of the first and second multiplexers generate a data frame having a predetermined number of digital audio bits and a predetermined number of pad bits. The first and second asynchronous data signals are multiplexed into at least one of the pad bits. The first and second synchronous digital voice signals are multiplexed into at least one of the digital audio bits. And the synchronous control command signal and the synchronous status indication signal are multiplexed into at least one of said pad bits.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 2:
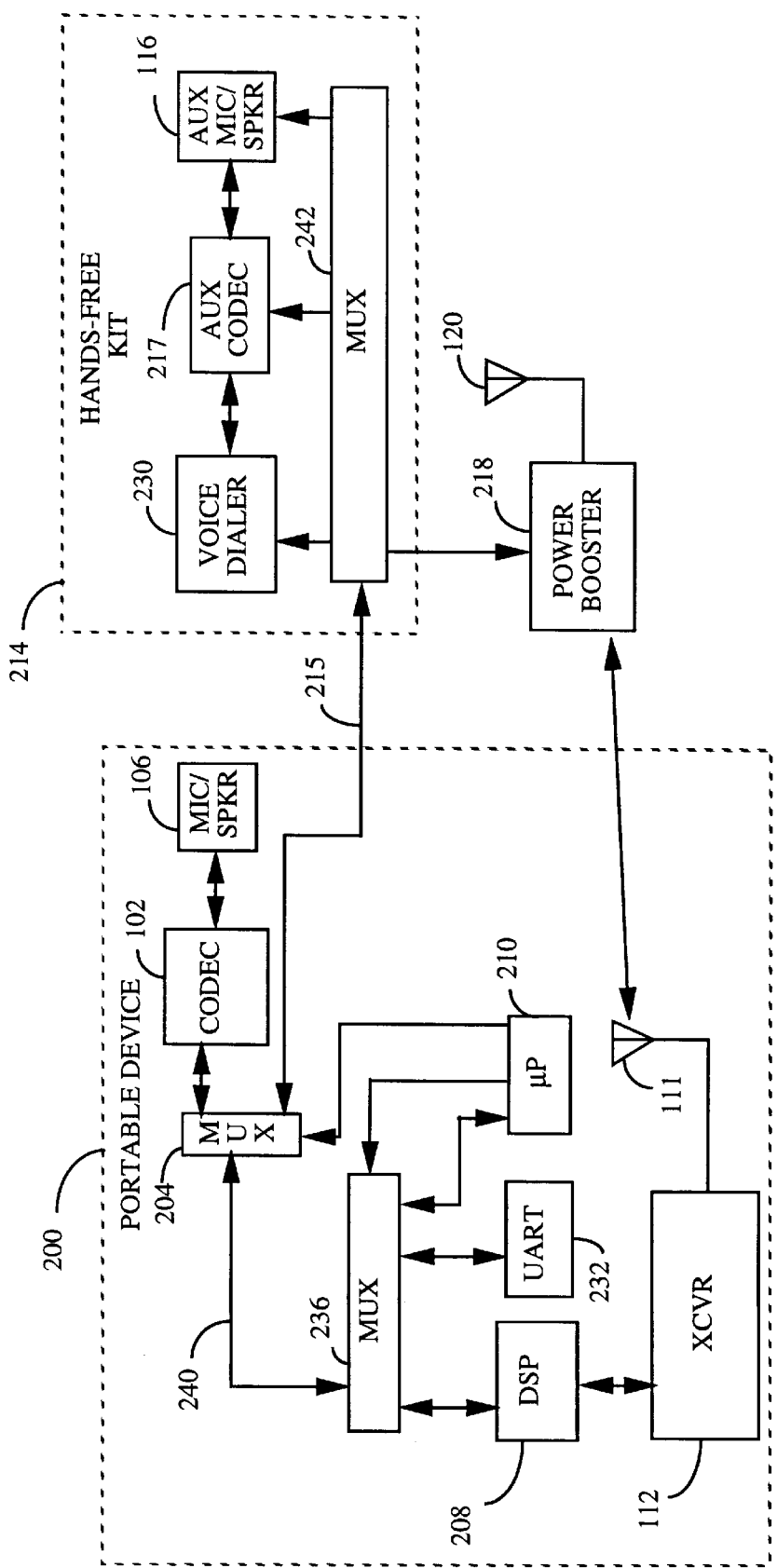
FIG. 2 is a block diagram of the portable communication device and accessory system of the present invention.

FIG. 2 illustrates a block diagram of the portable communication device and accessory system of the present invention. In the preferred embodiment, hands-free kit 214 serves as a physical "cradle" to receive portable device 200, and has a mechanical hookswitch (not shown) to determine when portable device 200 is in the cradle (an "on-hook" condition) and when portable device 200 is out of the cradle (an "off-hook" condition). When portable device 200 is connected to hands-free kit 214 and is in the cradle, it switches to operating in a hands-free mode. Whenever portable device 200 is out of the cradle, it operates in a portable mode. Portable device 200 may also be interfaced with hands-free kit 214, but still out of the cradle (i.e. off hook).

Antenna 111, transceiver 112, CODEC 102, and microphone and speaker 106 of FIG. 2 operate as described with reference to FIG. 1. However, when portable device 200 is operating in a portable mode (i.e. when it is either not connected to hands-free kit 214, or is connected to hands-free kit 214 but out of the cradle), microprocessor 210 configures serial communication bus multiplexer 204 to pass digital voice data between DSP 208 and CODEC 102. When portable device 200 is operating in a hands-free mode (i.e. when it is connected to hands-free kit 214 and in the cradle), microprocessor 210 configures serial communication bus multiplexer 204 to pass digital voice data from DSP 208 and synchronous control commands from microprocessor 210 and asynchronous data from UART 232 to hands-free kit 214 over digital interface 215. It should be noted that hands-free kit 214 may contain other functional blocks not illustrated in FIG. 2.

To accomplish the multiplexing of these three signals (i.e. digital voice data, synchronous control commands, and asynchronous data) onto a single digital interface 215, microprocessor 210 controls multiplexer 236. Specifically, on the forward path from portable device 200 to hands-free kit 214, microprocessor 210 controls multiplexer 236 to switch between synchronous control commands generated by microprocessor 210 and asynchronous data generated by UART 232 and digital voice data generated by DSP 208. Thus, the signal presented to multiplexer 204 over line 240 is a multiplexed signal that may contain digital voice data, asynchronous data, and synchronous control commands.

This forward path signal is switched by multiplexer 204 to digital interface 215 where each signal component is routed by multiplexer 242 to its respective destination. That is to say that the digital voice data from DSP 208 is routed to auxiliary CODEC 217, the synchronous control commands generated by microprocessor 210 may be routed to auxiliary microphone and speaker 116 or voice dialer 230 or power booster 218, and asynchronous data is routed to voice dialer 230. It should be noted that when the portable device 200 is in the portable mode, the asynchronous data and synchronous control commands need not be multiplexed onto the line 240 because microprocessor 210 configures multiplexer 204 to route signals to and from the internal CODEC 102 when the portable device 200 is in the portable mode.

On the reverse path from hands-free kit 214 to portable device 200, status indications generated by voice dialer 230, auxiliary CODEC 217, power booster 218 or auxiliary microphone and speaker 116 are multiplexed by multiplexer 242 with digital voice data from auxiliary CODEC 217 and asynchronous data from voice dialer 230. The multiplexed signal is then sent over digital interface 215 to multiplexer 204. Multiplexer 204 routes the multiplexed signal from digital interface 215 to multiplexer 236 over line 240. Multiplexer 236 then routes the signal components to their respective destinations. That is to say that digital voice data from auxiliary CODEC 217 is routed to DSP 208, status indications from voice dialer 230 or auxiliary CODEC 217 or auxiliary microphone and speaker 116 or power booster 218 are routed to microprocessor 210, and asynchronous data from voice dialer 230 is routed to UART 232.

Figure 1:
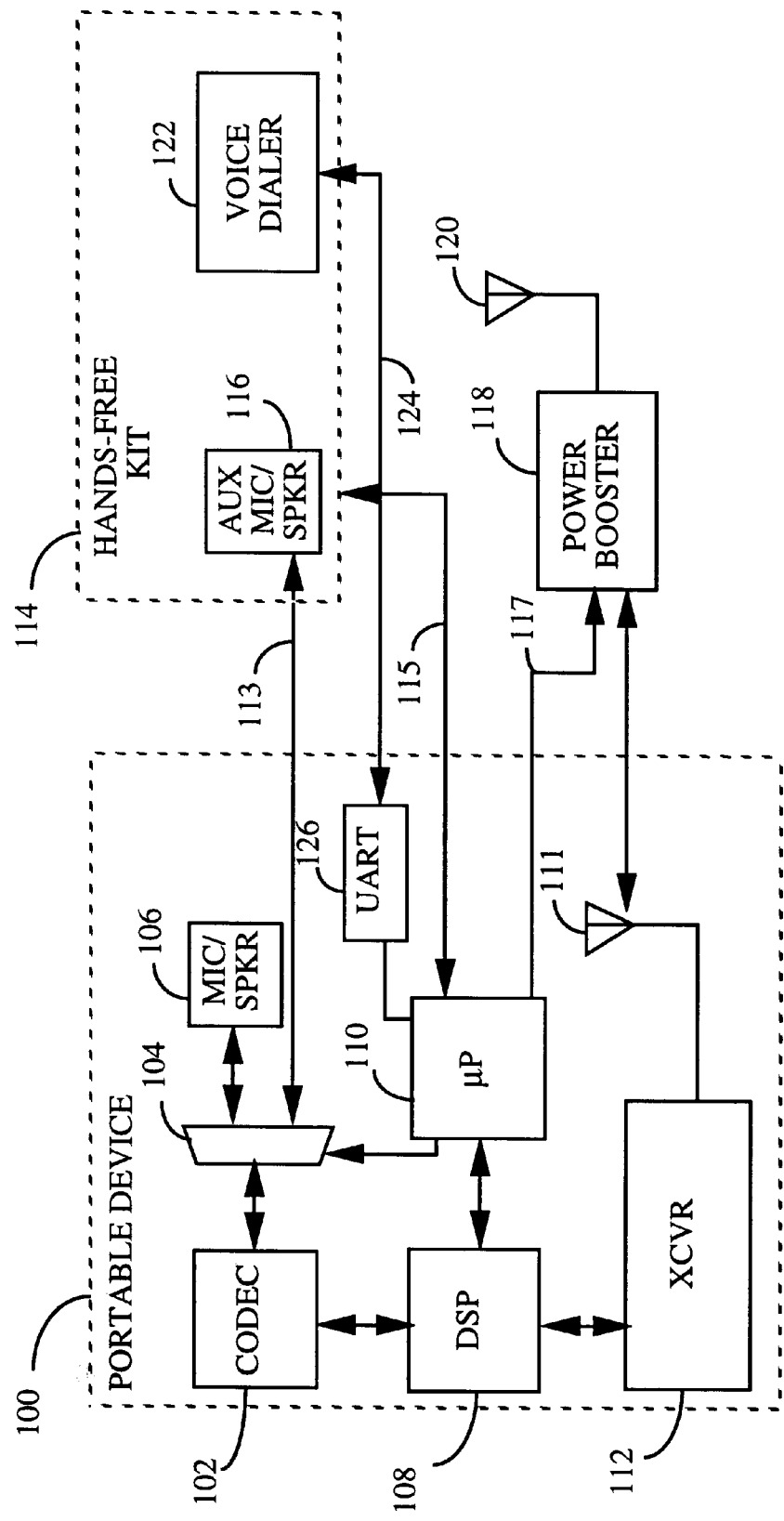
FIG. 1 is a block diagram of a prior art portable communication device and accessory system.

In this manner, a single flexible interface between portable communication device 200 and external accessories 214, 218 is accomplished which reduces the complexity of the interface over the prior art of FIG. 1. It should be noted that multiplexers 236, 204, and 242 may each be comprised of one or more individual multiplexing and de-multiplexing devices, but for simplicity they are shown as single blocks in FIG. 2. A serial interface suitable for use with the present invention is further disclosed in copending U.S. patent application Ser. No. 08/593,305, filed Jan. 31st, 1996, entitled "PORTABLE COMMUNICATION DEVICE AND ACCESSORY SYSTEM" assigned to the assignee of the present invention and incorporated herein by reference.

Figure 3A:
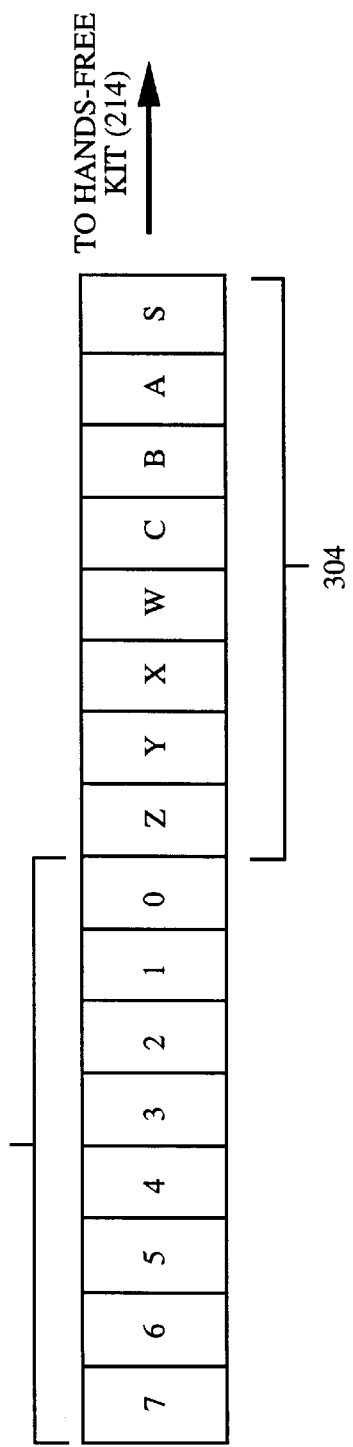
FIG. 3A is a diagram of the format of a single data frame on the forward path from the portable communication device to the hands-free kit.
Figure 3B:
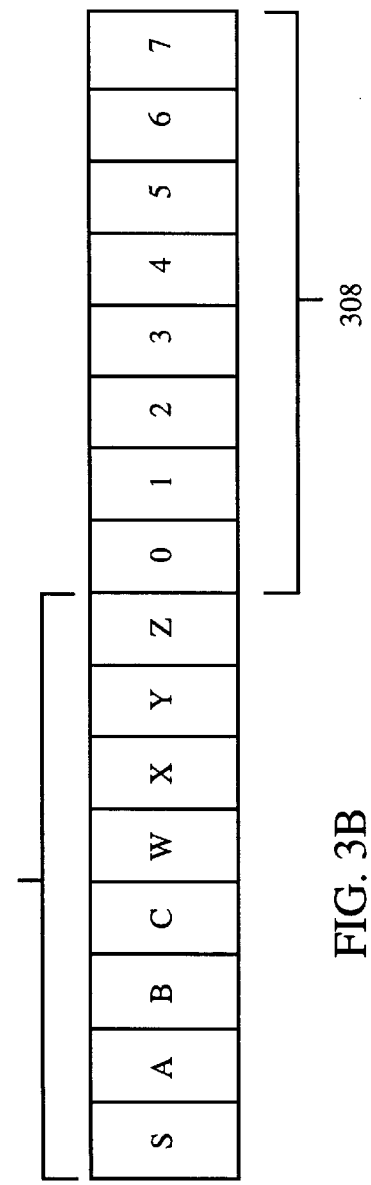
FIG. 3B is a diagram of the format of a single data frame on the reverse path from the hands-free kit to the portable communication device.

In the preferred embodiment, CODEC 102 and auxiliary CODEC 217 convert an analog voice signal to pulse-code modulated (PCM) digital format. Optionally, the PCM format may be a compressed μ-law or a-law format, or two's-complement linear format. FIGS. 3A and 3B illustrate the preferred embodiment of the serial data format which is created by the multiplexers 236 and 242, respectively, on line 240 and digital interface 215.

Referring to FIG. 3A, in the preferred embodiment, the serial communication link over the forward path from portable device 200 to hands-free kit 214 over digital interface 215 provides a 128 kbps data frame format in full-duplex, allocated as 64 kbps for PCM audio (digital voice data) represented by frame portion 304 and 64 kbps for either control commands or asynchronous data to the accessories represented by frame portion 302. In the preferred embodiment of FIG. 3A, each frame contains sixteen bits. Bit "S" of frame portion 304 is a start bit which indicates the beginning of the frame. Bits "A", "B", "C", "W", "X", "Y", and "Z" each represent a PCM audio sample from DSP 208 and intended for auxiliary CODEC 217 (see FIG. 2). Bits "0" through "7" each represent either a control command to one of the accessories, asynchronous data generated by UART 232 and intended for voice dialer 230 (see FIG. 2), or "pad" bits which carry no information but merely "pad" the frame to be sixteen bits long.

For example, in one embodiment, bits "7", "6", and "5" of frame portion 302 may represent volume (i.e. turn up or turn down) commands from microprocessor 210 to the auxiliary speaker 116, bits "4", "3", "2", and "1" may represent "pad" bits inserted by microprocessor 210, and bit "0" may represent the asynchronous data generated by UART 232 and intended for voice dialer 230.

In the example just described, the frame rate is 8 kbps (i.e. 128 kbps/16). Thus, the asynchronous data signal in bit "0" of frame portion 302 is sampled at a rate of 8 kbps. As such, a relatively low rate 1200 bps asynchronous data signal generated by UART 232 may be sampled into bit "0" at 8 kbps with about 15% jitter (i.e. 1200 bps/8000 bps). Clearly, other data frame formats with more or fewer bits, and with a higher or lower data rate may be used without departing from the present invention.

FIG. 3B represents the data frame format on the reverse path from the hands-free kit 214 to the portable device 200. In the preferred embodiment, this serial communication link over the reverse path also provides a 128 kbps data frame format, allocated as 64 kbps for PCM audio (digital voice data) represented by frame portion 306 and 64 kbps for either status indications or asynchronous data from the accessories represented by frame portion 308. In the preferred embodiment of FIG. 3B, each frame also contains sixteen bits with a similar structure as that of FIG. 3A.

For example, the asynchronous data signal in bit "0" of frame portion 308 may be sampled out at a rate of 8 kbps (i.e. the frame rate). As such, a relatively low rate 1200 bps asynchronous data signal generated by voice dialer 230 and intended for UART 232 may be sampled from bit "0" at 8 kbps with about 15% jitter (i.e. 1200 bps/8000 bps).

Thus, the present invention provides a full-duplex asynchronous synchronous serial communication link between a portable device 200 and an external accessory kit such as hands-free kit 214 over a single, flexible digital interface.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A system for exchanging asynchronous data over a synchronous communication interface between a communication device and an external accessory, said external accessory having at least one asynchronous internal device and at least one synchronous internal device, the system comprising:

a digital signal processor for generating a first synchronous digital voice signal;

a UART for generating a first asynchronous data signal;

a microprocessor for generating a synchronous control command signal;

a first multiplexer, located within said communication device, for multiplexing said first synchronous digital voice signal and said first asynchronous data signal and said synchronous control command signal to be transmitted to said external accessory via an interface line, said interface line coupling said communication device to said at least one external accessory; and a second multiplexer, located within said external accessory and coupled to said interface line, for routing said first synchronous digital voice signal and said synchronous control command signal to said at least one synchronous internal device, and for routing said first asynchronous data signal to said asynchronous internal device.

2. The system of claim 1 wherein said external accessory is a hands-free kit and said asynchronous internal device is a voice dialer, said voice dialer for receiving said first asynchronous data signal.

3. The system of claim 2 wherein said at least one synchronous device comprises:
- an auxiliary CODEC for decoding said first synchronous digital voice signal;
- an auxiliary microphone for receiving said synchronous control command signal; and
- an auxiliary speaker for receiving said synchronous control command signal.

4. The system of claim 2 further comprising a power booster coupled to said interface line, for receiving said synchronous control command signal.

5. The system of claim 1 wherein said asynchronous internal device is further for generating a second asynchronous data signal, and wherein said at least one synchronous internal device is further for generating a second synchronous digital voice signal and a synchronous status indication signal, and wherein said second multiplexer is further for multiplexing said second asynchronous data signal and said synchronous status indication signal onto said interface line, and wherein said first multiplexer is further for routing said second asynchronous data signal to said UART and for routing said synchronous status indication signal to said microprocessor.

6. The system of claim 5 wherein said external accessory is a hands-free kit and said asynchronous internal device is a voice dialer, said voice dialer for generating said second asynchronous data signal.

7. The system of claim 6 wherein said at least one synchronous device comprises:
- an auxiliary CODEC for generating said second synchronous digital voice signal; and
- an auxiliary microphone for generating said synchronous status indication signal.

8. The system of claim 6 further comprising a power booster coupled to said interface line, for generating said synchronous status indication signal.

9. The system of claim 5 wherein said first and second multiplexers each generate a data frame having a predetermined number of digital audio bits and a predetermined number of pad bits, said first and second asynchronous data signals being multiplexed into at least one of said pad bits, said first and second synchronous digital voice signals being multiplexed into at least one of said digital audio bits, and said synchronous control command signal and said synchronous status indication signal being multiplexed into at least one of said pad bits.

* * * * *